US012668950B2

(12) United States Patent
Kean et al.

(10) Patent No.: US 12,668,950 B2
(45) Date of Patent: Jun. 30, 2026

(54) INLINE BLADE WEAR ESTIMATION BASED ON PROCESSED SOIL SURFACE

(71) Applicant: LEICA GEOSYSTEMS TECHNOLOGY A/S, Odense SØ (DK)

(72) Inventors: Michael Goulet Kean, Odense C (DK); Tommi Juhani Kauppinen, Odense C (DK); Morten Nissen, Odense M (DK)

(73) Assignee: LEICA GEOSYSTEMS TECHNOLOGY A/S, Odense Sø (DK)

( * ) Notice: Subject to any disclaimer, the term of this patent is extended or adjusted under 35 U.S.C. 154(b) by 211 days.

(21) Appl. No.: 18/418,054

(22) Filed: Jan. 19, 2024

(65) Prior Publication Data

US 2024/0247467 A1 Jul. 25, 2024

(30) Foreign Application Priority Data

Jan. 20, 2023 (EP) ..................................... 23152738

(51) Int. Cl.
*E02F 9/26* (2006.01)
*E02F 3/84* (2006.01)
(Continued)

(52) U.S. Cl.
CPC .............. *E02F 9/26* (2013.01); *E02F 9/2029* (2013.01); *G01V 20/00* (2024.01); *G06T 7/001* (2013.01);
(Continued)

(58) Field of Classification Search
CPC . E02F 9/26; E02F 9/2029; E02F 3/844; E02F 9/265; E02F 9/262; G01V 20/00;
(Continued)

(56) References Cited

U.S. PATENT DOCUMENTS 9,824,490 B1 11/2017 Côtéet al.
2018/0174291 A1 6/2018 Asada et al.
(Continued)

FOREIGN PATENT DOCUMENTS

CA 2 575 856 A1 2/2006
EP 3 086 196 A1 10/2016
(Continued)

OTHER PUBLICATIONS

Extended European Search Report dated Jul. 6, 2023 as received in Application No. 23152738.3.

*Primary Examiner* — Sahar Motazedi
(74) *Attorney, Agent, or Firm* — Maschoff Brennan

(57) ABSTRACT

A method for deriving a wear state of a soil interaction component of a soil processing implement of a construction vehicle. The method comprises steps of 1.) providing a geometry model regarding an assumed shape of the soil interaction component, 2.) engaging the soil by using the soil interaction component and tracking a motion for deriving tracking data of the soil interaction component, 3.) using the tracking data and the geometry model to derive an expected 3D surface model, 4.) providing visual 3D perception data of a soil area affected by the engaging, such that the visual 3D perception data and the expected 3D surface model can be referenced to one another, and 5.) comparing the visual 3D perception data with the expected 3D surface model and, based thereof, determining a deviation of an effective shape of the soil interaction component from the assumed shape.

18 Claims, 3 Drawing Sheets

(51) Int. Cl.
　　 *E02F 9/20*　　　　 (2006.01)
　　 *G01V 20/00*　　　 (2024.01)
　　 *G06T 7/00*　　　　 (2017.01)

(52) U.S. Cl.
　　 CPC ........... *E02F 3/844* (2013.01); *G06T 2200/04*
　　　　　　　　 (2013.01); *G06T 2207/30164* (2013.01)

(58) Field of Classification Search
　　 CPC ................. G06T 7/001; G06T 2200/04; G06T
　　　　　　　　　　　 2207/30164; G06F 30/17
　　 See application file for complete search history.

(56)　　　　　　　　 References Cited

U.S. PATENT DOCUMENTS

| | | | |
|---|---|---|---|
| 2022/0383469 | A1 | 12/2022 | Mianzo et al. |
| 2022/0406104 | A1* | 12/2022 | Maeder ................. G05D 1/672 |
| 2025/0182472 | A1* | 6/2025 | Schleicher ........... G05D 1/0094 |

FOREIGN PATENT DOCUMENTS

| | | | |
|---|---|---|---|
| JP | 2019-167719 | A | 10/2019 |
| WO | 2019/197064 | A1 | 10/2019 |

* cited by examiner

INLINE BLADE WEAR ESTIMATION BASED ON PROCESSED SOIL SURFACE

FIELD

The present disclosure relates to a method of obtaining wear information of an implement of a construction vehicle and a computer program product based on it. The implement and the construction vehicle are utilized in construction related soil processing, such as grading, soil cutting or asphalt milling. The present disclosure further relates to a system comprising a computing unit, a positioning sensor, an implement tracking sensor, and a visual perception sensor to obtain the said information.

BACKGROUND

Contemporary construction vehicles are high value assets, thus the downtime of such machines is minimized. Another aspect which leads to a more efficient utilization of the construction vehicles is the reduction of the work passes, i.e. to provide the targeted soil surface with as few as necessary passes, in particular one, without further corrective actions. Contemporary construction vehicles exhibit automatized control systems to facilitate precise soil processing operations by fully or partially controlling the machine, in particular the implement pose. In a typical system a target soil profile is designed relative to the vehicle system while the operator is fully responsible for navigating the vehicle so that the system generates the correct surface by adjusting the pose of the implement based on the target soil profile. Alternatively, a 3D surface design model using a complex computer system might be provided. The vehicle can then be localized relative to the 3D design model to cut surface correctly with a variety of possible navigation motion.

By way of example from here on the features relating to the soil surface are described in a ground-referenced coordinate system, in particular an absolute geo-referenced coordinate system. Implement related features might be described in the following vehicle-centered system, the (forward) movement direction of the vehicle defines the X-axis, and the gravity vector defines the Z axis, the Y-axis is defined respectively. The orientation of the implement is described by three angles. The angle relative to a plane perpendicular to the Z-axis is referred as the attack angle, the angle relative to the plane perpendicular to the X-axis is referred as the crosscut angle, while the third angle relative to a plane perpendicular to the Y-axis is the heading angle. While the above definitions reflect the standard technical language this choice serves purely illustrative purposes. Alternative definitions of the orientation, in particular to use implement centered reference frames or the exclusive utilization of ground-referenced coordinate systems, are within the meaning of the disclosure. The present disclosure is not bound to any specific reference systems, and the person skilled in the art can realize the disclosure using any convenient coordinate system.

There are various measuring systems known for the specific needs in the field of construction, especially for construction vehicles, in particular graders, crawlers, or cold planers. Such measuring systems can be used to build a digital 3D representation of the surroundings of the vehicle, to detect obstacles in the surroundings of the vehicle, and/or to support a control of the construction vehicle. For example, EP 3 086 196 A1 suggests environment detection by means of a camera system arranged on a crawler. The camera system uses a simultaneous localization and mapping (SLAM) or structure from motion (SfM) algorithm to generate a 3D point cloud of the environment. JP 2019 167 719 A2 discloses a 2D laser scanner by means of which a 3D model of the environment is generated when an excavator, on which the 2D scanner is mounted, is pivoting. WO 2019/197064 A1 discloses a device for monitoring an environment of a vehicle with a ToF camera. Images generated this way are used for aiding an operator to control the operation of the construction vehicle on the site according to a plan.

For brevity and transparency from here on only motor grade types of construction vehicles will be discussed in detail. The specific features of other vehicles, in particular crawlers or cold planers, might be applied accordingly.

Since the implement of a grader experience strong abrasive effects during a soil processing operation it is typical that cutting edges, which experience the strongest abrasive effects, are replaceable "wear parts". Instead of replacing the whole implement exchanging only the cutting edge saves both material and man-hour related costs. E.g. CA 2 575 856 A1 discloses a system with replaceable wear parts. From here on, unless otherwise specified, replacing the implement might also mean replacing the said wear parts.

Due to the abrasive effects during the soil processing operation the shape of the implement starts deviating from the initial shape. The shape of the implement is, however, an input parameter for the automatized or automatic control methods. Consequently, if the actual implement shape differs strongly from the assumed shape precise soil processing operations are impossible.

The prior art method is an offline calibration, e.g. the implement is placed on a flat surface and its geometry is determined, in particular by imaging means or by measuring multiple spots with a ruler and manually entering the measured data to the control software. This calibration has to be done regularly, depending on the work task it might have to be performed several times a day. Since it is a tedious and time consuming activity, the operator working under time pressure might skip it. As a consequence, however, a falsely processed soil surface or in more grave cases a damage to the implement/construction vehicle might arise.

OBJECT

In view of the above circumstances, the object of the present disclosure is to provide more efficient soil processing and derivation of a wear state of the implement.

A further object of the present disclosure is to improve the performance of the of the construction vehicle, in particular to improve the wear characteristics of the implement.

These objectives are achieved by realizing the characterizing features of the independent claims. Features which further develop the disclosure in an alternative or advantageous manner are described in the dependent patent claims.

SUMMARY

The present disclosure relates to a method for deriving a wear state of a soil interaction component of a soil processing implement of a construction vehicle. Wear state in the sense of the present disclosure might mean a geometric shape of a soil interaction component, in particular wherein the soil interaction component is a replaceable part. Wear state might mean estimated remaining lifetime, load tolerances etc. Combinations and similar alternatives are within the sense of the present disclosure.

Soil processing in the sense of the present disclosure represents construction/earth moving type of processing, i.e. grading, ditching, soil cutting, milling etc. and not an agricultural tasks, i.e. spraying. Soil in the sense of the present disclosure might be artificial or partly artificial construction material, in particular concrete, tarmac, or asphalt. The soil might comprise different layers with different mechanical properties. Soil processing implement and construction vehicle in the sense of the present disclosure are implements and vehicles applied for the above task, in particular motor graders, crawlers, cold planers, or tractors mounting the appropriate implements.

The soil interaction component might be an integral part of the soil processing implement. The soil interaction component might comprise replaceable components or might be fully replaceable. The soil interaction component might comprise sub-components. The present disclosure is applicable to all of the above embodiments as well as to the reasonable combinations and alterations.

The method of deriving the wear state of the soil interaction component of the soil processing implement of a construction vehicle comprises the steps of 1.) providing a geometry model regarding an assumed shape of the soil interaction component, 2.) engaging the soil by using the soil interaction component and tracking a motion (associated with a motion of the soil interaction component) for deriving tracking data of the soil interaction component, 3.) using the tracking data and the geometry model of the soil interaction component to derive an expected 3D surface model caused by the engaging, 4.) after the engaging, providing visual 3D perception data of a soil area affected by the engaging with the soil interaction component, such that the visual 3D perception data and the expected 3D surface model can be referenced to one another, and, 5.) comparing the visual 3D perception data with the expected 3D surface model and, based thereof, determining a deviation of an effective shape of the soil interaction component from the assumed shape. It is self-explanatory for the skilled artisan that the utilization of numerals and letters does not represent a sequence of performing the said steps. These and all further numbers do not represent a temporal and spatial connection, not even in the form of a preferred sequence, and merely serve the purpose of readability. Variations in the execution sequence of the steps of the various embodiments of the method are within the sense of the present disclosure.

The geometry model regarding an assumed shape of the soil interaction component can take various forms. It might be a 3D design model, the position of a plurality points of e.g. the cutting edge, a linear or polynomial function approximating the plurality of points. The geometry model might be a model of the whole implement or might even comprise information regarding further components of the construction vehicle, in particular the equipment or arm. The present disclosure is not limited to any of these embodiments as long as the geometry model can be utilized to derive an expected 3D surface model caused by the engaging of the soil interaction component.

The soil might be engaged under manual control of the operator and/or utilizing a fixed implement pose. The soil might be engaged in an automatized manner, e.g. the pose of the soil interaction component is adjusted on the basis of a target value without further operator actions, in particular on the basis of a design model. The operator might guide the construction vehicle remotely. The soil might be engaged in a partly or fully automatic mode with limited operator interaction. The present disclosure can be utilized advantageously in combination with an automatized or automatic soil engaging. Nevertheless, the disclosure can also be utilized in combination with a manual control.

The tracking data might be provided by internal sensors, in particular kinematic sensors such as strain gauges, inclinometers, and accelerometers. Sensors of the implement and/or the further components of the construction vehicle might provide a pose of the implement relative to the construction vehicle. In particular the pose change of the construction vehicle might be provided by an odometer, and/or a GNSS receiver, and/or a wireless positioning system and/or by a total station positioning system (TPS). The tracking of the implement relative to the environment might be provided by localizing the vehicle in an external coordinate system and using implement tracking with respect to the vehicle-centered system. The tracking data might also be provided by visual perception means e.g. by visually determining the pose of the construction vehicle relative to the environment and the pose of the implement relative to the vehicle. The present disclosure is not limited to a specific sensor to provide the tracking data.

The expected 3D surface model caused by the engaging may be referenced to an external, in particular to a georeferenced absolute coordinate system. While the present disclosure can be advantageously applied in a referenced coordinate system, the disclosure is applicable to vehicle referenced coordinate systems. Moreover, the present disclosure might be applied even if the expected 3D surface model is not to scale.

Visual 3D perception data might be based on a set of 2D images, e.g. on the basis of stereo photography or SLAM/SfM type reconstruction algorithms. Visual 3D perception data might be based on depth images e.g. provided by a time of flight camera or images reconstructed from a lidar and/or scanner and/or profiler data. The present disclosure might be applicable with any of the above listed techniques or with suitable combinations or alternatives thereof.

There are many methods in the prior art for referencing two 3D datasets to each other, in particular the visual 3D perception data and the expected 3D surface model. Referencing might be carried on the basis of identifying and matching of corresponding cardinal features. Referencing might be carried out on the basis of localization data, in particular by performing a repetitive calibration action. The present disclosure is not limited to a specific referencing method, the skilled person can provide one or more appropriate referencing method.

The system can identify whether the visual 3D perception data is sufficiently consistent with the expected 3D surface model. If the expected 3D surface model and the visual 3D perception data are inconsistent, then the system can attempt to identify the extent and type of the inconsistency, in particular if the surface height shows a difference exceeding a threshold. Inconsistency might be represented by a global Boolean type variable, e.g. the perceived surfaces is consistent/not consistent with the expected surface. Inconsistency might be represented with a global numerical variable e.g. a matching of 97% found. Inconsistency might be represented on a local basis, e.g. as a map comprising deviating areas. In particular for the latter case the type of inconsistencies might also be identified and highlighted in a display, e.g. cobble in the soil, likely dent in the soil interaction component, soil interaction component misaligned etc.

In some embodiments soil the processing being one of soil cutting and/or soil leveling and/or grading and/or ditching and/or cold planning.

In some embodiments the 3D perception data provide a field of view comprising an area directly behind the soil processing implement. Directly behind in the sense of the present disclosure might also mean that at least a part of the implement is detected by the visual perception sensor. Alternatively, to avoid artefacts caused by perceiving of the implement a clearance might be utilized. These embodiments fall into the category of directly behind the implement according to the sense of the present disclosure. Providing a field of view comprising an area directly behind the soil processing implement is especially advantageous by the fact that it provides an in-line feedback, i.e. the data might be utilized to compensate the wear state of the soil processing implement in a control loop. Integrating or averaging the data might nevertheless be utilized to minimize effect of local deviations, in particular pebbles or cobbles and their traces on the visual 3D perception data. Such embodiments are especially advantageous when the soil is engaged in a continuous forward movement.

In some alternative embodiments the visual 3D perception data are generated in subsequent engaging pass. Such embodiments might be preferably utilized wherein the pass length are small, thus the data based on the previous pass is reasonably representative of the present state. The data might be collected by a forward looking sensor. Unlike to the visual perception sensor components providing a field of view behind the soil processing implement, forward looking sensors might be mounted on a safe, protected location of the construction vehicle. I.e. a risk of pollution and/or damage to the sensor might be lower in these embodiments. As a further advantage, forward looking sensors might collect data from a larger surface area, in particular they might collect data from a section up to hundreds of meters. These embodiments are advantageous in combination with an integration of the visual 3D perception data.

In some embodiments the method further comprises accessing an initial 3D surface model of the pre-processed soil. The method might comprise accessing a target surface and/or a work task. In some specific embodiments a pose of the soil interaction component is controlled in an automatized manner or automatically on the basis of the initial 3D surface model of the soil and the geometry model of the soil interaction component. This workflow represents a typical contemporary soil processing, wherein the operator is responsible for driving the construction vehicle and responsive to machine messages and/or schedule changes, while the details of the implement control are provided automatized or automatically by the controller. Depending on the work task, in particular for tasks with risk of death or injury, the operator might guide the construction vehicle remotely.

In some embodiments a corrected geometry model of the soil interaction component is derived on the basis of the determined deviation of an effective shape of the soil interaction component from the assumed shape. The corrected geometry model might replace of the geometry model for the automatized or the automatic control of the pose of soil processing implement. Unless otherwise provided the features of the geometry model might be applicable to the corrected geometry model.

In some embodiments a wear pattern database is provided or updated. The wear pattern database comprises an evolution of the effective shape of the soil interaction component as a function of the tracking data. The wear pattern database might comprise data from precedent soil processing operations of the same or a different work vehicle. The wear pattern database might be provided to a remote server, in particular a fleet management server. The wear pattern database might comprise further data, in particular the mechanical properties of the soil. The wear pattern database might be utilized to derive an expected wear pattern, wherein the expected wear pattern represents the typical, in particular the median, evolution of the effective shape of the soil interaction component. An assessment might be provided whether the observed effective shape of the soil interaction component is consistent with the expected wear pattern.

In some embodiments implement adjustment commands for the soil processing implement are provided on the basis of the corrected geometry model of the soil interaction component. The implement adjustment commands cause the execution of the steps of 1.) engaging the soil by the soil interaction component on the basis of the corrected geometry model of the soil interaction component, and 2.) updating the expected 3D surface model on the basis of the corrected geometry model of the soil interaction component. In these embodiments the pose of the soil interaction component is corrected on the basis of the wear state in order to compensate the shape change. The benefits of such embodiments are two-fold. By adjusting the pose of the of the soil interaction component according to the effective shape, the adverse effects of the wearing of the soil interaction component are at least mitigated or ideally fully compensated. This leads to an improved soil processing wherein the number of subsequent passes to compensate the errors are reduced. Furthermore, such in-line adjustments may lead to less frequent maintenance and with that a more effective usage of the construction vehicle.

In some embodiments the adjustment commands for the soil processing implement are provided such that an anticipated wear reduce the deviation of the effective shape of the soil interaction component from the assumed shape. This might be realized e.g. as an exchange of the leading and trailing edges of the implement by adjusting the heading angle of the implement. Alternatively, the crosscut angle of the implement might be adjusted such that the load on the parts experienced more wear is reduced. These embodiments might be beneficially utilized in the preparatory passes, wherein the processed soil surface is not shaped to its final geometry. The advantage of such embodiments is a more efficient utilization of the soil interaction component by providing a more homogeneous wearing. This may lead to less frequent maintenance and with that a more effective usage of the construction vehicle. The anticipated wear might be provided on the basis of the wear pattern database.

In some embodiments an error message is provided to the operator on the basis of the corrected geometry model of the of the soil interaction component. The error message indicates that the processing of the soil cannot be performed within a tolerance range. The tolerance range might be a weighted integral of deviation of the effective shape of the soil interaction component from a required shape. The weighted integral might be calculated with respect to pose adjustment options for the soil interaction component. A further error message indicating that the soil processing implement needs to be replaced might also be provided to the operator. The benefits are again two-fold, first of all by not performing the soil processing task with an implement having an inappropriate shape the share of effective, useful work increases. In addition, by providing a clear, automatically generated indication that maintenance is due, a regular control over the need for maintenance can be omitted. The corrected geometry model of the soil interaction model might be communicated to a server, in particular to a fleet management server and the construction vehicle might be re-allocated to a task for which the tolerance range is higher.

In some embodiments data relating to an estimated remaining work hours of the soil interaction component is provided to the operator on the basis of a time evolution of the corrected geometry model of the soil interaction component. The estimated remaining work hours might be provided on the basis of the rate of erosion of the soil interaction component. The estimated remaining work hours might be provided further on the basis of the wear pattern database. The estimated remaining work hours might be communicated to a server, in particular to a fleet management server and the maintenance and/or the tasks of the construction vehicles might be allocated on the basis of the estimated remaining work hours.

In some embodiments the 3D perception data and/or the initial 3D surface model of the soil before the engaging comprises data regarding mechanical properties, in particular the resistance, of the soil. The data relating to an estimated remaining work hours of the soil interaction component is provided on the basis of the mechanical properties of the soil and on the basis of a time evolution of the of the corrected geometry model of the soil interaction component.

In some embodiments the method further comprises the steps of 1.) providing an automatized adjustment of a pose of the soil processing implement for optimizing the estimated remaining work hours, in particular on the basis of mechanical properties of the soil, and 2.) updating the data relating to the estimated remaining work hours of the implement. An adjustment might be an optimization of an attack angle and/or a heading of the implement. Apart from that a request for reduced velocity and/or shallower cut might also be provided for the operator. Especially for passes other than the final pass such optimization strategy might be carried out without influencing the total completion time, but protecting the machine. The perceived mechanical properties of the soil might also be communicated to a server, in particular to a fleet management server and the construction vehicles might be allocated to the work tasks on the basis of the wear state of the implement and the mechanical properties of the soil at the different worksites.

In some embodiments the method further comprises the steps of 1.) accessing a load limit of the soil processing implement, in particular the soil interaction component, representing an allowable load of soil processing implement during the soil processing task with respect to the corrected geometry model and/or the estimated remaining work hours, and 2.) providing an automatized adjustment of a pose of the soil processing implement for optimizing the estimated remaining work hours further on the basis of the load limit.

In some embodiments the comparing of the 3D perception data with the expected 3D surface model further comprises the steps of 1.) identifying a deviating area between the expected 3D surface model and the visual 3D perception data, in particular with difference in a surface height outside a tolerance range at a surface area, 2.) determining a longitudinal extent of the deviating area, wherein a longitudinal direction is the direction of movement of the soil processing implement, 3.) categorizing a deviating area as insignificant, wherein the longitudinal extent of deviating area is below an area threshold value, 4.) excluding the insignificant deviating areas from the comparison. Insignificant deviating areas might be cobbles on the ground or traces of such cobbles as they dragged by the soil processing implement. While such traces might cause a significant deviation in height, they nevertheless contain no information regarding the wear state of the implement and can be regarded as measurement artifacts. Thus, it is beneficial to identify and exclude such measurement artifacts affected areas from the visual 3D perception data. Identifying these areas by the limited longitudinal extent is especially advantageous as it requires no further input data.

In some embodiments the method further comprises the steps of 1.) performing a backward movement of the construction vehicle, wherein the backward movement represent a movement within the processed soil surface, 2.) identifying the traces of construction vehicle, in particular track or wheel marks, in the visual 3D perception data, 3.) excluding the domains from the visual 3D perception data comprising traces of the construction vehicle. In alternative embodiments the said domains might be excluded on the basis of the known geometry of the construction vehicle, in particular known axle width. These embodiments are advantageous for construction vehicles, wherein placing the visual perception sensor such that it provides a field of view comprising an area directly behind the soil processing implement is complicated or not recommended due to other reasons, in particular due to a risk of pollution and/or damage. These embodiments might also be advantageous for crawler type of construction vehicles, which typically carry out a construction task in as a series of short forward-backward movements.

The present disclosure also relates to a system for deriving a wear state of a soil interaction component of a soil processing implement of a construction vehicle configured to carry out a selected embodiment of the method. The system comprises a computing unit, an implement tracking sensor, a positioning sensor, and a visual perception sensor. The definition of the computing unit, implement tracking sensor, positioning sensor and visual perception sensor are functional definitions. Any of the above might comprise a plurality of separate physical components. Moreover, the computing unit, the implement tracking sensor, the visual perception sensor, and the positioning sensor might comprise remote components not located in or on the construction vehicles. A non-exclusive list of remote components includes external cameras, total stations or equivalent instruments, remote servers. Furthermore, a given physical component might contribute to a plurality of functional components, e.g. a camera might also act as a positioning sensor via a SLAM or SfM method.

The visual perception sensor is configured to be arranged on the construction vehicle such that its pose is referenceable to the construction vehicle. The visual perception sensor is configured to provide visual perception sensor data to the computing unit, wherein the visual perception sensor data enable a derivation of visual 3D perception data of a soil area affected by the engaging with the soil interaction component. The visual perception sensor might have a fixed pose, however the present disclosure is equally applicable to cases wherein the relative pose of the visual perception sensor is adjustable to the vehicle in a traceable manner. The visual perception sensor might comprise physically separate components, in particular as parts of a stereo-camera. The visual perception sensor might comprise components with a forward field of view and/or a downward field of view and/or a backward field of view. The visual perception sensor might provide camera images, in particular camera images appropriate for a SLAM/SfM algorithm. The visual perception sensor might utilize scanning methods and provide data enabling a reconstruction of a 3D representation of the soil surface. The visual perception sensor might comprise a laser profiler, and/or a lidar and/or a time of flight camera.

The computing unit is configured to 1.) retrieve an assumed shape of the soil interaction component, 2.) derive tracking data (associated with the motion of the soil interaction component) on the basis of sensor readings of the implement tracking sensor and the positioning sensor, 3.) derive an expected 3D surface model caused by the engaging using the tracking data and the geometry model of the soil interaction component, 4.) derive the visual 3D perception data of a soil area affected by the engaging with the soil interaction component such that the visual 3D perception data and the expected 3D surface model can be referenced to one another, 5.) compare the visual 3D perception data with the expected 3D surface model and, based thereof, determine a deviation of an effective shape of the soil interaction component from the assumed shape. It is also clear that the computing unit is configured to carry out generic numerical and geometrical operations in the above mentioned 3D perception data and expected 3D surface model, in particular to determine distances, areas and volumes.

In some embodiments the computing unit is configured to receive a 3D design model of the desired soil surface and to reference the 3D design model to the expected 3D surface model and the 3D perception data. The computing unit might further derive a construction task, in particular based on the difference of the 3D design model and the 3D perception data, in particular wherein the visual perception sensor comprises components with forward field of view. The computing unit might provide guidance instructions and/or implement adjustment commands on the basis of the 3D design data and further on the basis of the data provided by the positioning sensor.

In some embodiments the construction vehicle is a motor grader, a crawler, or a cold planer. The soil processing implement might be configured for soil cutting, grading, cold planning or leveling.

In some embodiments the visual perception sensor comprises a component mounted on the construction vehicle that its field of view comprises an area of the processed soil surface directly behind the soil processing implement, in particular wherein the visual perception sensor further comprises a forward looking component providing a view of unengaged soil.

In some embodiments the visual perception sensor is configured to provide 1.) first visual data on the soil interaction component representing a wear state before starting the soil processing, 2.) second visual data on the soil interaction component representing a wear state after finishing the soil processing. The computing unit is configured to provide a comparison between the measured shape of the soil interaction component on the basis of the first and second visual data and a corrected geometry model of the of the soil interaction component, wherein the corrected geometry model is derived on the basis of the determined deviation of the effective shape of the soil interaction component from the assumed shape. In some alternative embodiments other type of data, in particular measurements by a ruler, provide the measured shape of the soil interaction component before starting the soil processing and after finishing the soil processing. Such comparisons might provide feedback on the evaluation of the image data to provide the visual 3D perception data and/or the derivation of corrected geometry model of the soil interaction component.

In some embodiments the positioning sensor comprises a GNSS receiver, and/or a TPS, and/or a wireless positioning system, and/or a visual positioning system (VPS), and/or a visual-inertial positioning system (VIPS). The positioning sensor might provide absolute geo-referenced data. The present disclosure is however applicable with local referencing of the visual 3D perception data and the expected 3D surface model.

The present disclosure also relates to a computer program product for deriving a wear state of a soil interaction component of a soil processing implement of a construction vehicle. The computer program product might be stored on a machine-readable medium, or might be embodied by an electromagnetic wave comprising a program code segment. The computer program product has computer-executable instructions for performing the steps of 1.) retrieving input data, wherein the input data comprises a.) a geometry model regarding an assumed shape of the soil interaction component, b.) tracking data of the soil interaction component, and c.) visual perception sensor data of a soil area affected by the engaging with the soil interaction component, 2.) deriving on the basis of the input data a.) visual 3D perception data of a soil area affected by the engaging with the soil interaction component, and b.) an expected 3D surface model caused by the engaging, wherein the visual 3D perception data and the expected 3D surface model are referenced to one another, 3.) determining a deviation of an effective shape of the soil interaction component from the assumed shape on the basis of comparing the visual 3D perception data with the expected 3D surface model.

Some embodiments of the computer program product is configured for performing the computational steps of a selected embodiment of the method, in particular when run on a computing unit of a system according to the present disclosure.

BRIEF DESCRIPTION OF THE DRAWINGS

By way of example only, specific embodiments will be described more fully hereinafter with reference to the accompanying figures, wherein.

DETAILED DESCRIPTION

Figures 1A, 1B, 1C:
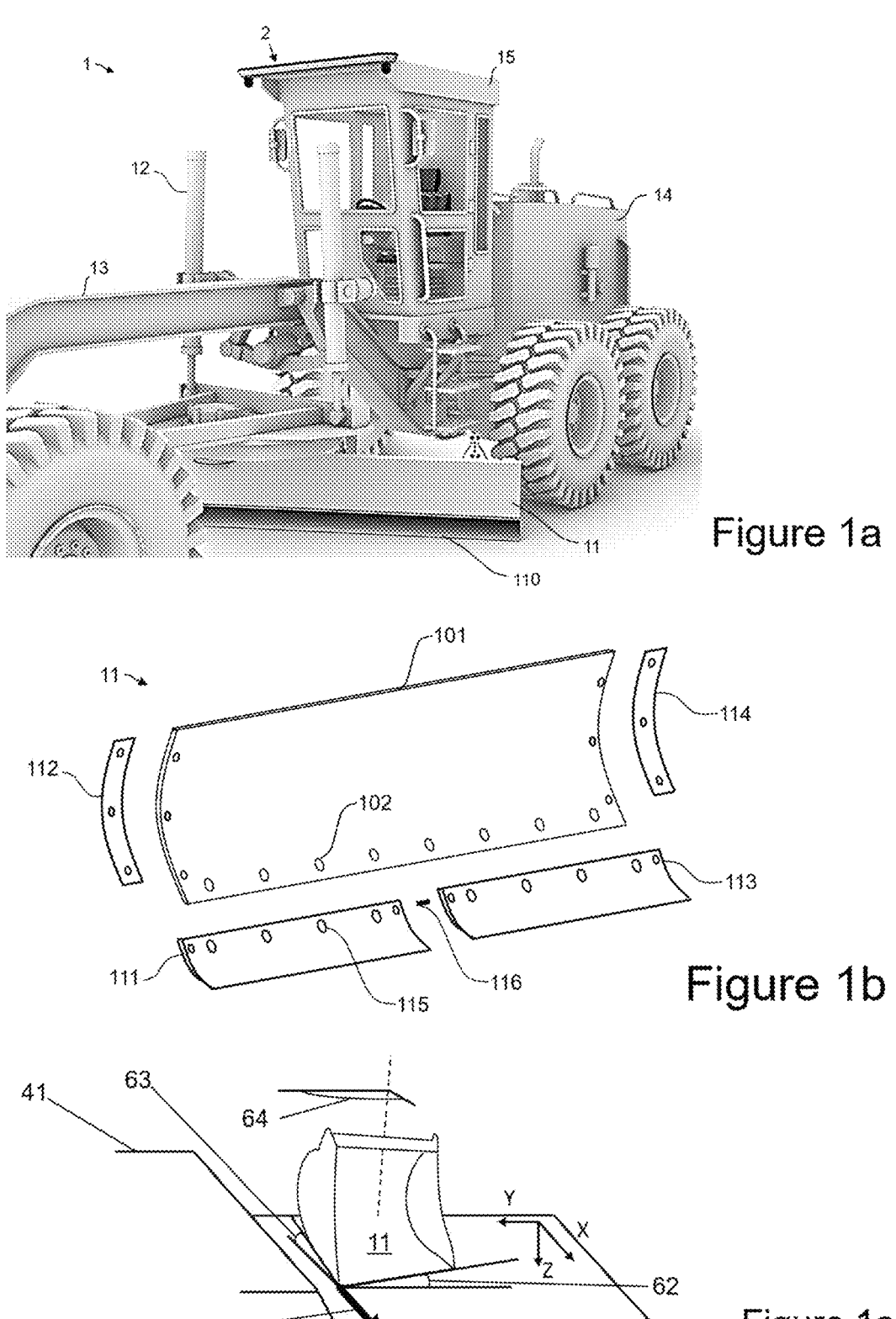
FIG. 1a shows an embodiment of the construction vehicle as a grader.
FIG. 1b shows an embodiment of a soil processing implement comprising a moldboard and replaceable cutting edges and side cutting elements as soil interaction elements.
FIG. 1c shows an exemplary coordinate system for the implement.

FIG. 1a shows an example of the construction vehicle 1 as a motor grader. The grader comprises a driver cab 15, a chassis 14, and a frame 13 configured for movably mounting an equipment 12. A soil processing implement 11 is mounted on the equipment 12 such that its pose can be varied. The soil processing implement 11, depicted as a blade, is configured for performing a soil processing task, i.e. a soil cutting and/or grading operation. The soil processing implement 11 and/or the equipment 12 might be replaced under field conditions for performing further tasks. Blades typically comprise a soil interaction component 110, depicted as a single piece cutting edge, as a replaceable wear component. Thus, during a long-term operation of the construction vehicle 1 only the soil interaction component 110 and not the whole soil processing implement 11 must be exchanged. While the depicted embodiment of the soil processing implement 11 is economically advantageous might be equally applicable if the soil interaction component 110 is an integral part of the implement 11.

The construction vehicle 1 is equipped with a visual perception sensor 2, depicted as a lidar sensor. The placement of the visual perception sensor 2 on the front of the driver cab 15, while providing some advantages regarding the extent of the field of view and the safety of the visual perception sensor 2, serves purely illustrative purposes. The visual perception sensor 2 might be placed on the chassis 14, in particular providing a rearward view and/or a downward view, on the frame 13, on the equipment 12, or on the soil processing implement 11. Furthermore, the present disclosure is not limited to the application of a single sensor component as the visual perception sensor 2. On the contrary, providing a first sensor component with a forward and a second sensor component with rearward or downward looking field of view is especially advantageous. Such setup allows the determination of the initial 3D surface model of the soil before processing and visual 3D perception data of a soil area affected by the engaging from measurement data.

FIG. 1b depicts an embodiment of the soil processing implement 11 as a moldboard 101 with replaceable cutting edge elements 111,113 and side cutting elements 112,114. The cutting edge in this embodiment comprises two elements 111,113 which might be attached, in particular bolted or screwed, to the moldboard 101 via the respective joints on the moldboard 102 and the cutting edge elements 115. The cutting edge elements 111,113 might be attached together with appropriate fastening means 116. Replacing one or more of the cutting edge elements 111,113 is equivalent to replacing the soil processing implement 11 in the sense of the present disclosure.

Variations of the implement 11 depicted in FIG. 1a and 1b exists and the present disclosure is applicable to each of these alternative embodiments. The present disclosure is neither limited to the depicted motor grader as construction vehicle 1 but can be applied with any appropriate construction vehicle 1, in particular a crawler or a cold planer. The present disclosure can also be applied in combination tractors, excavators etc. with non-permanent implement mountings.

FIG. 1c shows a possible vehicle-referenced coordinate system to describe the implement pose. A (forward) movement direction 61 of the vehicle defines an X-axis, and the gravity vector defines a Z axis, a Y-axis defined respectively. The orientation of the implement is described by three angles. An angle relative to a plane perpendicular to the Z-axis is referred as attack angle 63, an angle relative to the a plane perpendicular to the X-axis is referred as crosscut angle 62, while a third angle relative to a plane perpendicular to the Y-axis is called heading angle 64. Alternative definitions of the orientation also exist, in particular a local normal of the perceived soil surface data 41 might define the Z-axis. The present disclosure is not bound to any specific reference systems, and the skilled person can realize the disclosure using any convenient coordinate system.

Figure 2A:
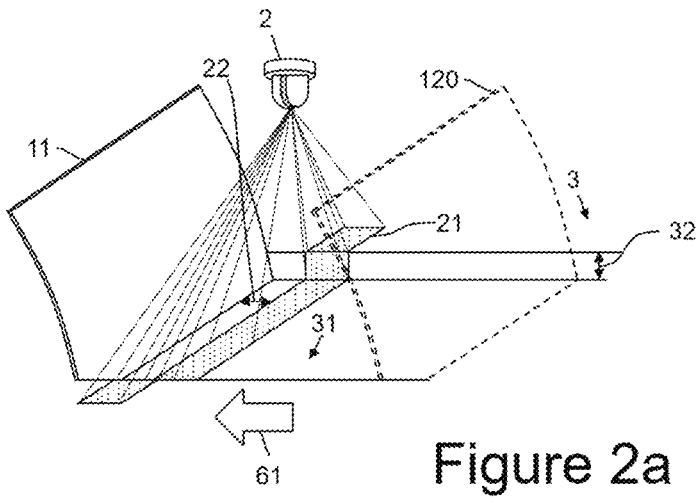
FIG. 2a shows an embodiment of collecting image data with a field of view comprising an area directly behind the soil processing implement.

FIG. 2a depicts an embodiment wherein the soil processing implement 11 is engaging the soil 3 with a forward movement along the movement direction 61. A previous position 120 of the implement is also depicted for illustrative purposes. The depicted task is a soil cutting/ditching wherein the soil processing implement 11 removes a given thickness 32 from the soil 3 and the processed soil surface 31 is a flat, smooth surface with a height below that of the unprocessed soil. The depicted soil processing task is an exemplary embodiment, the present disclosure might be equally applicable to other types of soil processing, in particular levelling or grading. In the depicted embodiment the heading of the implement is aligned to the movement direction 61, the present disclosure is not limited to such embodiment, but also include the cases, wherein the implement 11 is angled to the movement direction 61.

The visual perception sensor 2 comprises a component with a field of view 21 directly behind the soil processing implement 11. FIG. 2a depicts an embodiment wherein "directly behind" is interpreted to include a clearance 22. This arrangement is "directly behind" in the sense of the present disclosure. The field of view 21 of the visual perception sensor 2 might also comprise a part of the implement 11 itself, such arrangements are also "directly behind" for the present disclosure.

Figure 2B:
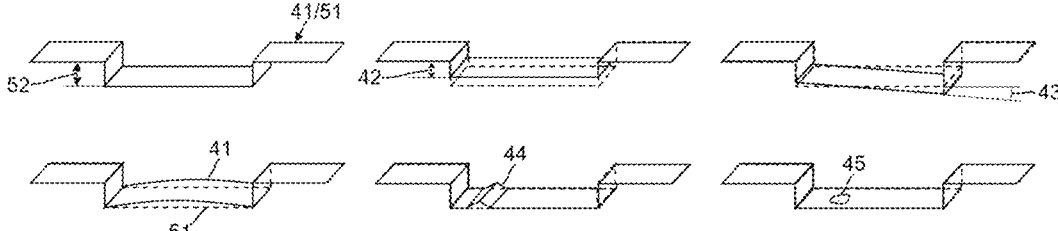
FIG. 2b shows some examples of inconsistencies between the visual 3D perception data and the expected 3D surface model.

FIG. 2b depicts some examples of inconsistencies between the visual 3D perception data 41, depicted as solid lines, and the expected 3D surface model 51, depicted as dashed lines, on the basis of the ditching task of FIG. 2a. The ditching task might be to provide a flat smooth ditch with vertical sidewalls and a given depth 52. The depicted ditching task is just an exemplary illustration of the possible soil processing tasks and the specific features of other soil processing tasks might be applied respectively. Furthermore, in the depicted examples it is also assumed that the sensor readings are correctly representing the actual surface, and the expected 3D surface model 51 and the visual 3D perception data 41 are correctly referenced. Thus, the main cause of the inconsistency is the wear state and/or a misalignment of the implement. The present disclosure might also be utilized to uncover other failures, in particular faulty implement sensors, controller commands or worn components of the implement and/or the equipment.

The right hand side example of the top row represents the ideal case wherein the visual 3D perception data 41 and the expected 3D surface model 51 corresponds perfectly, i.e. the implement geometry model describes the actual geometry of the implement. The second example in the middle position of the top row represents a state wherein the actually perceived depth 42 is less than the expected depth 52, i.e. the soil interaction component is worn and it is not engaging the soil in the expected depth. In the left hand side of a top row the actually perceived ditch is tilted by a tilting angle 43. Such an effect might have been caused by a misalignment of the implement or an asymmetric wear.

In the bottom row on the right side the central part of the visual 3D perception data 41 is inconsistent with the expected 3D surface model 51. This might have been caused by a non-homogeneous wear of the implement, wherein the central part abraded faster than the edges. The middle position of the bottom row depicts an example with a long inconsistent area 44. This might have been caused by a dent on the implement. The left side of the bottom row depicts a local defect 45, e.g. a cobble on the surface, such local defects 45 are typically not representative of the implement geometry and therefore they should be disregarded for the analysis.

The in FIG. 2b depicted examples is a non-exclusive list of the possible inconsistencies. Such inconsistencies might appear in combination with each other or with similar alternatives. Other types of soil processing might have other, process specific inconsistencies. Such modifications and alternatives are within the sense of the present disclosure.

Figure 3:
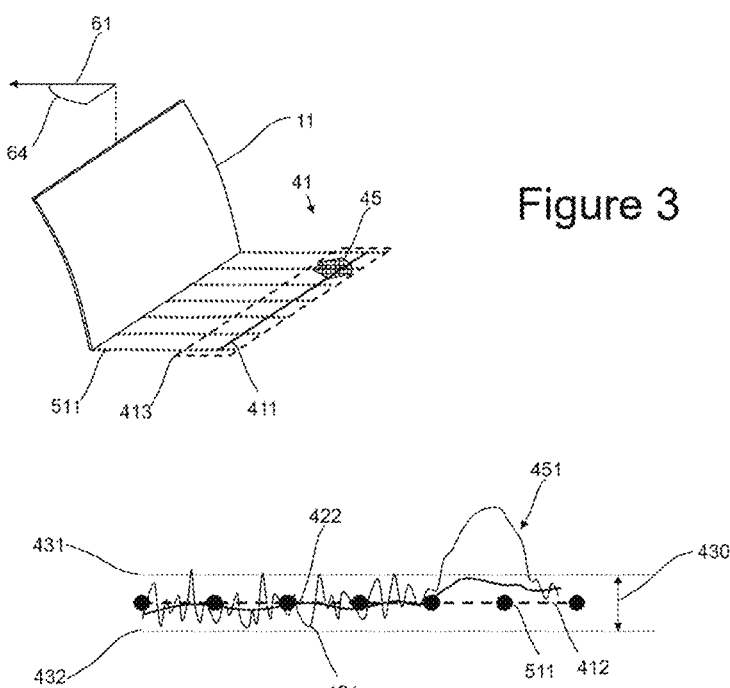
FIG. 3 depicts an embodiment of comparing the visual 3D perception data and a kinematic model of the implement.

FIG. 3 on the top part depicts an implement 11 guided along a movement direction 61 with a heading angle 64. The kinematic model of the implement, based on e.g. sensor readings from internal sensors and positioning sensors provides a trace 511 of a plurality of soil interaction component points. Said trace is referenced to the 3D perception data 41. Based on this referencing the pose of the soil interaction component at a previous time 411 might be derived.

On the bottom a cross section 421 of the 3D perception data 41 at the previous pose 411 of the soil interaction component is shown. The trace 511 defines a nominal geometry model of the soil interaction component. Here only the expected depth 412 of the soil interaction component is shown. Moreover the here depicted embodiment of a non-inclined implement is chosen purely for transparency reasons, the person skilled in the art understands that the pose of the implement can take any reasonable value. The cross section 421 of the 3D perception data 41 is noisy. The noise might arise from the imaging system, but may also represent the actual soil geometry e.g. in the case of coarse grained soil. Irrespective of the origin of the noise, a tolerance range 430 around the expected depth 412 of the soil interaction component might be defined to filter the noise out, e.g. with a lower 432 and upper threshold 431. An area 451 shows a deviation which is outside of the tolerance range 430. Since the said area 451 is caused by the imaging of a local defect 45 caused by a cobble it is not representative of the wear state of the implement 11.

An averaging over an interval 413 along the movement direction 61 leads to a less noisy, averaged cross section 422. Due to the limited longitudinal extent of the local defect 45, wherein the longitudinal direction is the direction of movement 61 of the soil processing implement 11, the deviating area 451 in the averaged cross section 422 does not show a deviation outside the tolerance range 430. Analyzing the complete or a partial dataset of the 3D perception data 41 to determine local defects 45 and exclude such area from the 3D perception data 41 is also possible.

Figure 4:
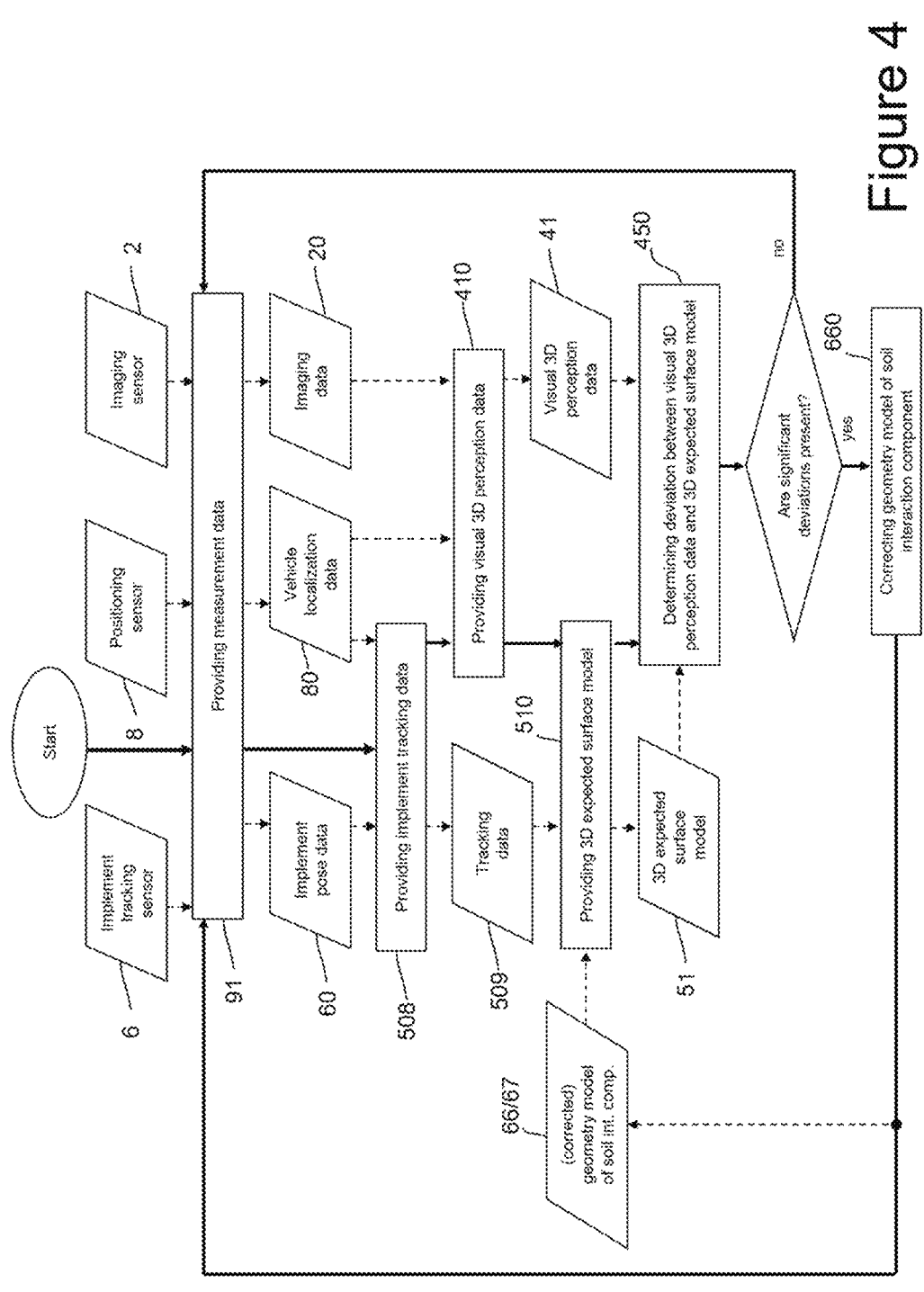
FIG. 4 depicts a schematic flowchart on an embodiment of the inventive method.

FIG. 4 depicts an exemplary flowchart representing an embodiment of the inventive method. Flow/command lines are shown with bold while data lines are shown with dashed lines. The implement tracking sensor 6, the positioning sensor 8 and the visual perception sensor 2 provides measurement data 91 as implement pose data 60, vehicle localization data 80 and imaging data 20. The definition of the sensors is based on functionality, a given physical sensor component might provide different types of data, e.g. a camera with VPS capability might act both as positioning sensor 8 and visual perception sensor 2. The implement tracking sensor 6 might be realized as a plurality of GNSS receiver with real-time kinematics capability, and the said plurality of GNSS receivers might also provide vehicle localization data 80. All of the implement tracking sensor 6, positioning sensor 8 and visual perception sensor 2 might comprise a plurality of physically distinct components, e.g. two cameras. Similar combinations and alternatives are within the sense of the present disclosure.

Tracking data 509 is provided 508 on the basis of the implement pose data 60 and the vehicle localization data 80. The expected 3D surface model 51 is provided 510 on the basis of the implement tracking data 509 and further on the basis of the geometry model 66 or of the corrected geometry model 67 of the soil interaction component. In the depicted embodiment the visual 3D perception data 41 is provided 410 on the basis of the vehicle localization data 80 and the imaging data 20. A deviation is determined 450 between the visual 3D perception data 41 and the expected 3D surface model 51. If the deviation is significant, the geometry model 66 or the corrected geometry model 67 of the soil interaction component is further corrected 660 on the basis of the deviation.

Although aspects are illustrated above, partly with reference to some specific embodiments, it must be understood that numerous modifications and combinations of different features of the embodiments can be made. All of these modifications lie within the scope of the appended claims.

The invention claimed is:

1. A method for deriving a wear state of a soil interaction component of a soil processing implement of a construction vehicle, wherein the method comprises:

provided a geometry model regarding an assumed shape of the soil interaction component, engaging a soil by using the soil interaction component and tracking a motion of the soil interaction component for deriving tracking data of the soil interaction component, using the tracking data and the geometry model of the soil interaction component to derive an expected 3D surface model caused by the engaging, after the engaging, providing visual 3D perception data of a soil area affected by the engaging with the soil interaction component, such that the visual 3D perception data and the expected 3D surface model can be referenced to one another, comparing the visual 3D perception data with the expected 3D surface model and, based thereof, determining a deviation of an effective shape of the soil interaction component from the assumed shape, and providing implement adjustment commands to the construction vehicle for adjusting the soil processing implement on the basis of the determined deviation, wherein the implement adjustment commands are provided to adjust the soil processing implement such that an anticipated wear with adjustment of the soil processing implement reduces the deviation of the effective shape of the soil interaction component from the assumed shape.

2. The method according to claim 1, wherein the method further comprises accessing an initial 3D surface model of the soil before the engaging, wherein a pose of the soil interaction component is controlled automatically on the basis of the initial 3D surface model of the soil and the geometry model of the soil interaction component.

3. The method according to claim 2, wherein:

the visual 3D perception data and/or the initial 3D surface model of the soil before the engaging comprises data regarding mechanical properties, a resistance, of the soil, and data relating to an estimated remaining work hours of the soil interaction component is provided on the basis of the mechanical properties of the soil and on the basis of a time evolution of a corrected geometry model of the soil interaction component, wherein the method further comprises:

providing an automatized adjustment of a pose of the soil processing implement for optimizing the estimated remaining work hours, on the basis of the mechanical properties of the soil, and updating the data relating to the estimated remaining work hours.

4. The method according to claim 2, wherein the comparing of the visual 3D perception data with the expected 3D surface model further comprises:

identifying a deviating area between the expected 3D surface model and the visual 3D perception data with a difference in a surface height outside a tolerance range at a surface area, determining a longitudinal extent of the deviating area, wherein a longitudinal direction is a direction of movement of the soil processing implement, categorizing the deviating area as insignificant when the longitudinal extent of the deviating area is below an area threshold value, and excluding the insignificant deviating area from the comparison.

5. The method according to claim 1, further comprising deriving a corrected geometry model of the soil interaction component on the basis of the determined deviation of the effective shape of the soil interaction component from the assumed shape, to provide or update a wear pattern database, wherein the wear pattern database comprises an evolution of the effective shape of the soil interaction component as a function of the tracking data.

6. The method according to claim 5, further comprising:

providing the implement adjustment commands for the soil processing implement on the basis of the corrected geometry model of the soil interaction component, wherein the implement adjustment commands cause:

engaging the soil by the soil interaction component on the basis of the corrected geometry model of the soil interaction component, and updating the expected 3D surface model on the basis of the corrected geometry model of the soil interaction component, and further comprising:

providing an error message to an operator of the construction vehicle on the basis of the corrected geometry model indicating that processing the soil cannot be performed within a tolerance range, and/or providing an error message to the operator on the basis of the corrected geometry model indicating that the soil processing implement needs to be replaced, and/or providing data to the operator relating to an estimated remaining work hours of the soil interaction component on the basis of a time evolution of the corrected geometry model of the soil interaction component, and on the basis of the wear pattern database.

7. The method according to claim 6, wherein the method further comprises:

accessing a load limit of the soil processing implement, the soil interaction component, representing an allowable load of the soil processing implement during a soil processing task with respect to the corrected geometry model and/or the estimated remaining work hours, and providing an automatized adjustment of a pose of the soil processing implement for optimizing the estimated remaining work hours on the basis of the load limit.

8. The method according to claim 6, wherein the comparing of the visual 3D perception data with the expected 3D surface model further comprises:

identifying a deviating area between the expected 3D surface model and the visual 3D perception data with a difference in a surface height outside a tolerance range at a surface area, determining a longitudinal extent of the deviating area, wherein a longitudinal direction is a direction of movement of the soil processing implement, categorizing the deviating area as insignificant when the longitudinal extent of the deviating area is below an area threshold value, and excluding the insignificant deviating area from the comparison.

9. The method according to claim 5, wherein the comparing of the visual 3D perception data with the expected 3D surface model further comprises:

identifying a deviating area between the expected 3D surface model and the visual 3D perception data with a difference in a surface height outside a tolerance range at a surface area, determining a longitudinal extent of the deviating area, wherein a longitudinal direction is a direction of movement of the soil processing implement, categorizing the deviating area as insignificant when the longitudinal extent of the deviating area is below an area threshold value, and excluding the insignificant deviating area from the comparison.

10. The method according to claim 1, wherein the comparing of the visual 3D perception data with the expected 3D surface model further comprises:

identifying a deviating area between the expected 3D surface model and the visual 3D perception data with a difference in a surface height outside a tolerance range at a surface area, determining a longitudinal extent of the deviating area, wherein a longitudinal direction is a direction of movement of the soil processing implement, categorizing the deviating area as insignificant when the longitudinal extent of the deviating area is below an area threshold value, and excluding the insignificant deviating area from the comparison.

11. The method according to claim 1, wherein the method further comprises:

performing a backward movement of the construction vehicle, wherein the backward movement represents a movement within a processed soil surface, identifying traces of the construction vehicle, track or wheel marks, in the visual 3D perception data, and excluding domains from the visual 3D perception data comprising the traces of the construction vehicle.

12. A computer program product stored in a non-transitory computer readable medium and configured for automatic execution of computation of the method according to claim 11, when run on a computing unit of a system.

13. A system for deriving the wear state of the soil interaction component of the soil processing implement of the construction vehicle, wherein the system is configured to carry out the method of claim 1, for which it comprises a computing unit, an implement tracking sensor, a positioning sensor, and a visual perception sensor, wherein:

the visual perception sensor is configured to:

be arranged on the construction vehicle such that its pose is referenceable to the construction vehicle, and provide visual perception sensor data to the computing unit enabling a derivation of the visual 3D perception data of the soil area affected by the engaging with the soil interaction component, the computing unit is configured to:

retrieve the assumed shape of the soil interaction component, derive the tracking data on the basis of sensor readings of the implement tracking sensor and the positioning sensor, derive the expected 3D surface model caused by the engaging using the tracking data and the geometry model of the soil interaction component, derive the visual 3D perception data of the soil area affected by the engaging with the soil interaction component such that the visual 3D perception data and the expected 3D surface model can be referenced to one another, and compare the visual 3D perception data with the expected 3D surface model and, based thereof, determine the deviation of the effective shape of the soil interaction component from the assumed shape.

14. The system according to claim 13, wherein the computing unit is configured to receive a 3D design model of a desired soil surface and to reference the 3D design model to the expected 3D surface model and the visual 3D perception data.

15. The system according to claim 13, wherein the construction vehicle is a motor grader, a crawler or a cold planer, and the soil processing implement is configured for soil cutting or leveling, and the visual perception sensor comprises a component mounted on the construction vehicle so that its field of view comprises an area of a processed soil surface directly behind the soil processing implement, wherein the visual perception sensor further comprises a forward looking component providing a view of unengaged soil.

16. The system according to claim 13, wherein:

the visual perception sensor is configured to provide:

first visual data on the soil interaction component representing a wear state before starting soil processing, and second visual data on the soil interaction component representing a wear state after finishing the soil processing, the computing unit is configured to provide a comparison between a measured shape of the soil interaction component on the basis of the first and the second visual data and a corrected geometry model of the soil interaction component, wherein the corrected geometry model is derived on the basis of the determined deviation of the effective shape of the soil interaction component from the assumed shape.

17. A computer program product stored in a non-transitory computer readable medium and configured for an automatic execution of the method according to claim 1, when run on a computing unit of a system.

18. A computer program product comprising program code, wherein the program code is stored on a non-transitory machine-readable medium, wherein the program code comprises a program code segment for deriving a wear state of a soil interaction component of a soil processing implement of a construction vehicle, wherein the computer program product comprises computer-executable instructions for performing:

retrieving input data comprising:

a geometry model regarding an assumed shape of the soil interaction component, tracking data of the soil interaction component, and visual perception sensor data of a soil area affected by engaging with the soil interaction component, deriving on the basis of the input data:

visual 3D perception data of the soil area affected by the engaging with the soil interaction component, and an expected 3D surface model caused by the engaging, wherein the visual 3D perception data and the expected 3D surface model are referenced to one another, determining a deviation of an effective shape of the soil interaction component from the assumed shape on the basis of comparing the visual 3D perception data with the expected 3D surface model, and providing adjustment commands to the construction vehicle for adjusting the soil processing implement on the basis of the determined deviation, wherein the adjustment commands are provided to adjust the soil processing implement such that an anticipated wear with adjustment of the soil processing implement reduces the deviation of the effective shape of the soil interaction component from the assumed shape.

* * * * *